(12) United States Patent
Shalaby

(10) Patent No.: US 11,101,676 B1
(45) Date of Patent: Aug. 24, 2021

(54) MULTI-FUNCTION PORTABLE ELECTRONIC DEVICE

(71) Applicant: Ramy Mohamed Tawfik Shalaby, Pleasanton, CA (US)

(72) Inventor: Ramy Mohamed Tawfik Shalaby, Pleasanton, CA (US)

( * ) Notice: Subject to any disclaimer, the term of this patent is extended or adjusted under 35 U.S.C. 154(b) by 0 days.

(21) Appl. No.: 16/875,676

(22) Filed: May 15, 2020

Related U.S. Application Data

(62) Division of application No. 16/191,238, filed on Nov. 14, 2018, now Pat. No. 10,998,747.

(60) Provisional application No. 62/588,166, filed on Nov. 17, 2017.

(51) Int. Cl.
| | | |
|---|---|---|
| *H02J 7/00* | (2006.01) | |
| *H02J 7/14* | (2006.01) | |
| *G06F 1/26* | (2006.01) | |
| *G06F 1/18* | (2006.01) | |
| *F21V 23/04* | (2006.01) | |
| *H01R 27/02* | (2006.01) | |
| *H04R 1/02* | (2006.01) | |
| *H04N 21/422* | (2011.01) | |
| *H04N 21/443* | (2011.01) | |
| *H04N 21/439* | (2011.01) | |
| *H01R 13/66* | (2006.01) | |
| *F21V 33/00* | (2006.01) | |
| *H04B 1/3816* | (2015.01) | |
| *H04N 21/4363* | (2011.01) | |

(52) U.S. Cl.
CPC ........ *H02J 7/0068* (2013.01); *F21V 23/0464* (2013.01); *F21V 33/0052* (2013.01); *G06F 1/181* (2013.01); *G06F 1/263* (2013.01); *H01R 13/6675* (2013.01); *H01R 27/02* (2013.01); *H04N 21/42203* (2013.01); *H04N 21/439* (2013.01); *H04N 21/4436* (2013.01); *H04R 1/028* (2013.01); *H04B 1/3816* (2013.01); *H04N 21/43635* (2013.01)

(58) Field of Classification Search
USPC .......................................................... 320/107
See application file for complete search history.

(56) References Cited

U.S. PATENT DOCUMENTS

| | | | | |
|---|---|---|---|---|
| 7,011,538 B2 * | 3/2006 | Chang | .................... | H01R 13/60 439/172 |
| 9,153,986 B1 * | 10/2015 | Herr | ...................... | H02J 7/0044 |
| 10,181,735 B2 * | 1/2019 | Byrne | ................... | H02J 7/0068 |

(Continued)

*Primary Examiner* — Alexis B Pacheco
(74) *Attorney, Agent, or Firm* — Plager Schack LLP; Mark H. Plager; Alexis J. Saenz

(57) ABSTRACT

Portable charging is integrated with multi-function electronic device capabilities into a single portable hub package. The hub combines several desirable consumer electronics functions together while at the same time providing a portable reliable power source that can power or charge any device while reducing the carrying weight and complexity of consumer electronics needs. Embodiments include a bi-directional battery, a variety of electrical connection interfaces, and a CPU to coordinate power charging and power distribution to connected devices. Some embodiments may further include other convenient functions including for example, wireless charging, image projection, and software application run-time for applications including media streaming.

10 Claims, 8 Drawing Sheets

(56) References Cited

U.S. PATENT DOCUMENTS

| | | | |
|---|---|---|---|
| 2005/0225292 A1* | 10/2005 | Damlamian | H02J 7/00047 320/128 |
| 2007/0247105 A1* | 10/2007 | Krieger | H02J 7/00038 320/104 |
| 2012/0281392 A1* | 11/2012 | Workman | H02J 7/35 362/183 |
| 2013/0193911 A1* | 8/2013 | Miller | H02J 7/0027 320/107 |
| 2013/0200841 A1* | 8/2013 | Farkas | H02J 7/0042 320/107 |
| 2014/0152257 A1* | 6/2014 | Miller | H02J 2207/40 320/111 |
| 2015/0015180 A1* | 1/2015 | Miller | H02J 7/0042 320/103 |
| 2015/0028797 A1* | 1/2015 | Miller | H02J 7/0003 320/103 |
| 2016/0097522 A1* | 4/2016 | Chien | F21S 6/003 362/183 |
| 2016/0226266 A1* | 8/2016 | Huang | H02J 7/0068 |
| 2018/0019614 A1* | 1/2018 | Fillit | H02J 4/00 |
| 2018/0314296 A1* | 11/2018 | Evans, V | G06F 13/4081 |

* cited by examiner

MULTI-FUNCTION PORTABLE ELECTRONIC DEVICE

CROSS-REFERENCE TO RELATED APPLICATIONS

This application is a divisional application of U.S. application Ser. No. 16/191,238, filed Nov. 14, 2018, which claims benefit under 35 U.S.C. § 119(e) of U.S. Provisional Application having Ser. No. 62/588,166 filed Nov. 17, 2017, which are hereby incorporated by reference herein in its entirety.

BACKGROUND

The embodiments herein relate generally to consumer electronics and more particularly, to a multi-function portable electronic device.

The need for mobility increases with time for business or pleasure. This brings two problems; a lack of a portable, reliable power source to power or charge the many electronic devices a person may carry, and the need to consolidate so many multiple device functions. As one many carry many different devices, weight on the person (or luggage) increases along with the complexity of managing so many devices.

There are some current market devices which provide a portable power source but are generally limited to recharging devices. In addition, charging devices usually need an outlet to draw power from, making them less convenient for portability since many locations such as airports or businesses, limit access to a wall outlet. Some portable batteries are single use and for a single device until they can be re-charged again by being plugged into a power outlet.

Some other products have multiple device functions but are limited to for example, two or three functions in one. This may be because their power supply and packaging limit the number of compatible device functions that can work together.

Embodiments of the disclosed invention solve these problems.

SUMMARY

In one aspect of the subject technology, a multi-function device is disclosed which comprises: a housing; a central processing unit (CPU) in the housing; a bi-directional power bank housed in the housing and connected to the CPU, the bi-directional power bank configured to supply power on demand and configured to re-charge; a power switch connected to the power bank and the CPU; a plurality of universal serial bus (USB) ports connected to the CPU and integrated into one or more surfaces of the housing; and a microphone connected to the CPU, wherein the CPU is programmed to register an audible command signal through the microphone and in response to the command, activate the power switch.

In another aspect, multi-function, portable electronic hub is disclosed, which comprises: a housing; a central processing unit (CPU) in the housing; a bi-directional power bank housed in the housing and connected to the CPU, the bi-directional power bank configured to supply power on demand and configured to re-charge; a power switch connected to the power bank and the CPU; a plurality of universal serial bus (USB) ports connected to the CPU and integrated into one or more surfaces of the housing; a wireless charging module integrated into the housing for wireless charging of mobile electronic devices; a subscriber identification module (SIM) card slot and a wireless antenna, wherein the CPU is configured to establish a wireless signal to the Internet through the wireless antenna using SIM cards swapped in and out of the SIM card slot by users; and a microphone connected to the CPU, wherein the CPU is programmed to register an audible command signal through the microphone and in response to the command, activate the power switch.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
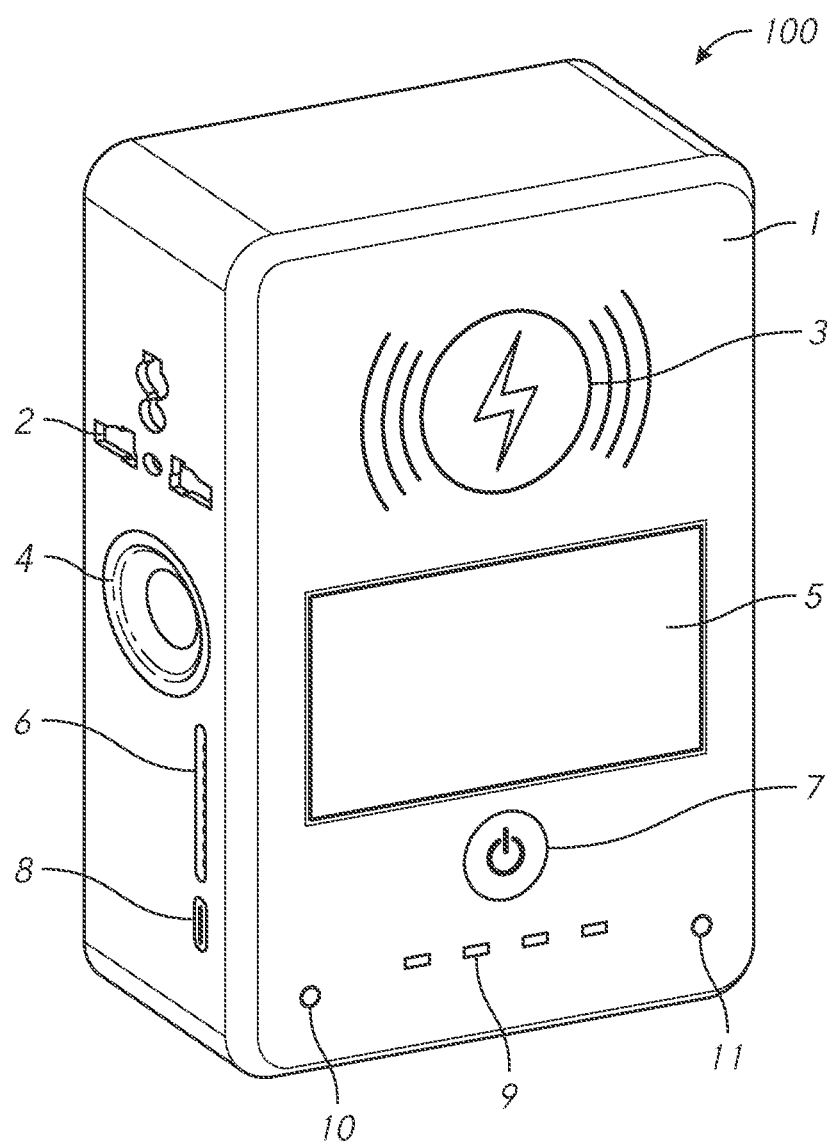
FIG. 1 is a perspective, left side, front view of a multi-function electronic device according to an embodiment of the invention.

In general, embodiments disclosed integrate portable charging with multi-function electronic device capabilities into a single portable hub package. Other devices are partially solving the problem of a portable power source or partially consolidating some functions in a device but none is providing the combined functions together and at the same time providing a portable, reliable power source that can power or charge any device while reducing the carrying weight and complexity of consumer electronics needs.

Referring now to FIGS. 1-7, a multi-function electronics device hub 100 (sometimes referred to generally as "hub 100") is shown according to an exemplary embodiment. The device 100 provides a reliable, portable bi-directional power source along with a centralized device for accessing various electronic functions (which may include for example, data reading, data transfer, data storage, audio/visual playback, wireless connectivity, and wireless charging). It will be understood that while FIGS. 1-7 show externally accessible features integrated into the device housing 1, some features are internal and best shown by schematic as disclosed below in FIGS. 8-11. In an exemplary embodiment, many of the components have a direct or indirect connection to a central processing unit (CPU) 50 (FIG. 11) that is inside of the hub housing 1 and controlling many of the device functions. In general, a power button 7 may be integrated into the housing 1, which controls powering on/off the hub 100. Some embodiments may include waterproofing liner or gasket 80 to protect the internal electrical components from water damage.

Figure 2:
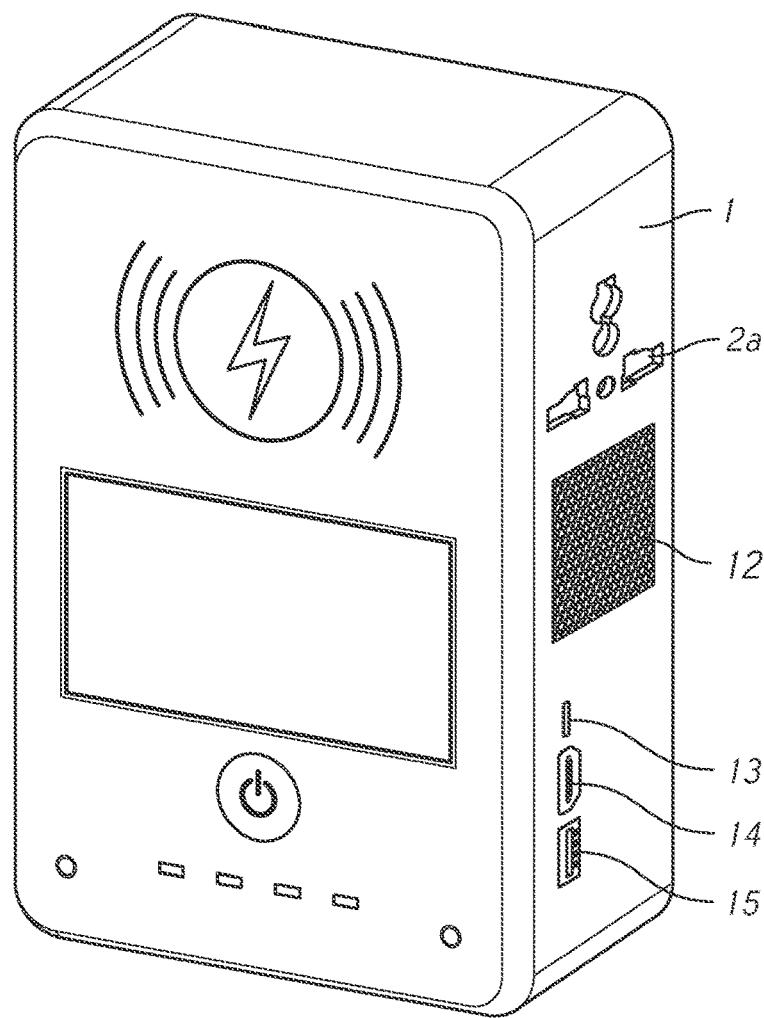
FIG. 2 is a perspective, right side, front view of the device of FIG. 1.
Figure 3:
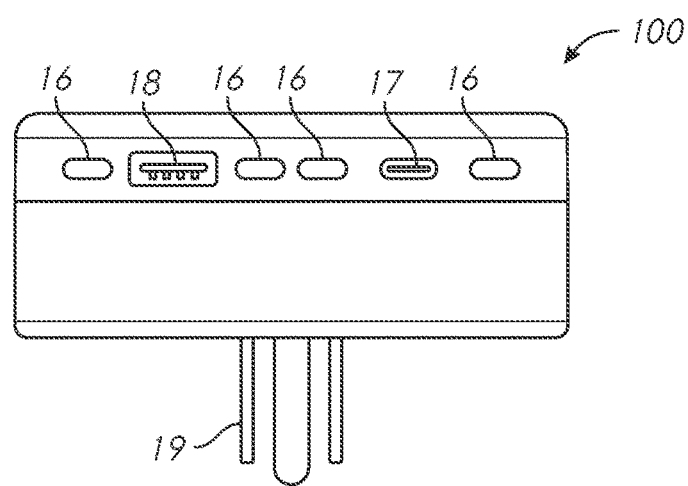
FIG. 3 is a bottom view of the device of FIG. 1.
Figure 4:
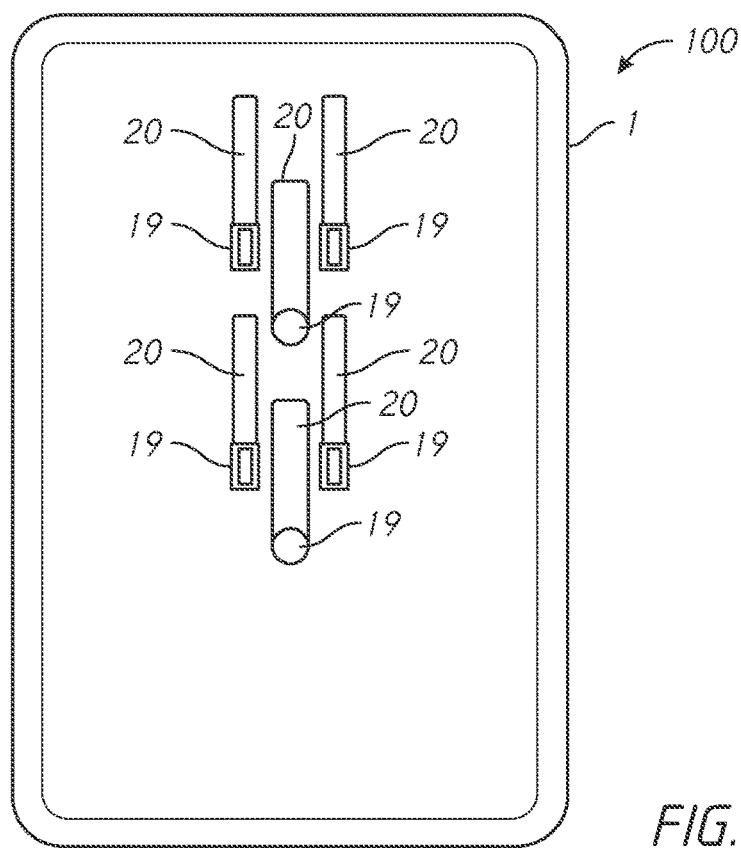
FIG. 4 is a rear view of the device of FIG. 1.
Figure 6:
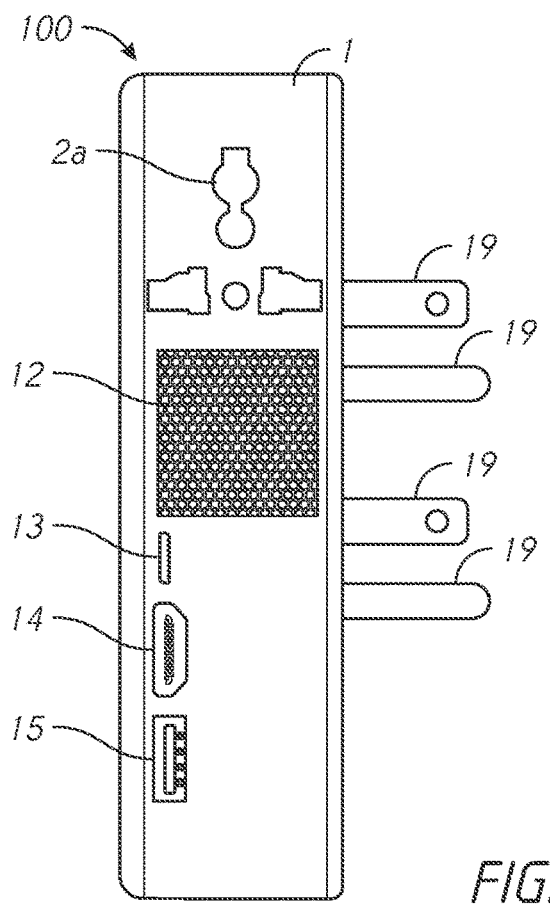
FIG. 6 is a right-hand side view of the device of FIG. 1.
Figure 7:
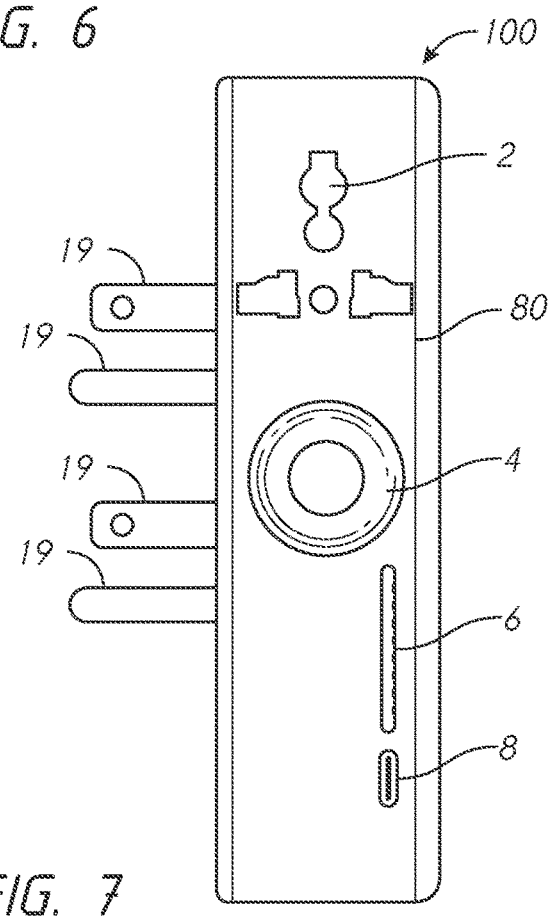
FIG. 7 is a left-hand side view of the device of FIG. 1.

In an exemplary embodiment, the hub 100 may include a universal outlet 2 (and in some embodiments a second universal outlet 2a located on the opposite side of the housing 1 as shown in FIGS. 2 and 6). The universal outlet 2 (and 2a) may be configured to receive a variety of electrical plugs for devices that need a power source. This feature may be particularly useful for larger or older electronic devices when a wall outlet is not readily available.

Figure 5:
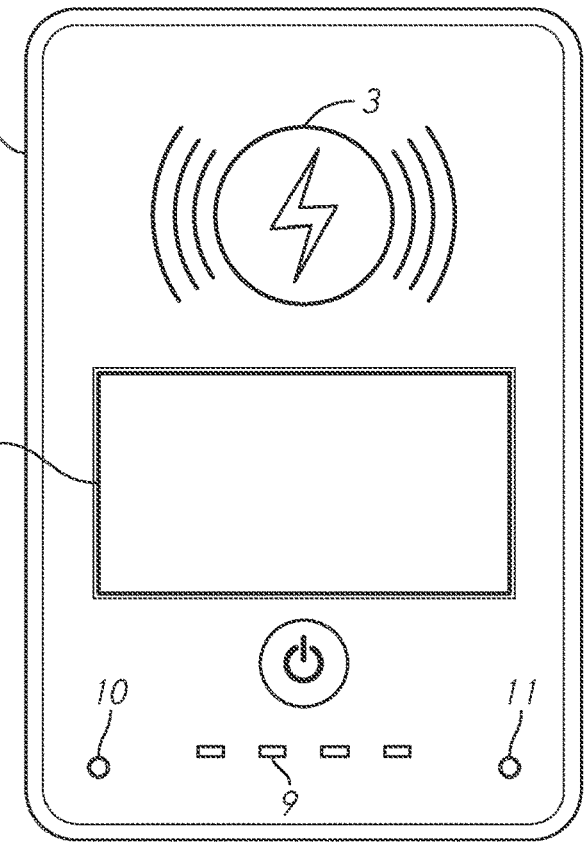
FIG. 5 is a front view of the device of FIG. 1.

In some embodiments, the hub 100 may include a wireless charging module 3 for electronic devices that are equipped for wireless charging capability. As shown in FIGS. 1, 2, and 5, the wireless charging module 3 may include a surface on the front of the housing 1 designated for receipt of user devices for charging. In an exemplary embodiment, the wireless charging module 3 may be configured for inductive charging using the Qi interface standard for an induction antenna 3a (see FIG. 11). As will be appreciated, portable chargers do not typically include a wireless charger because the power costs may be too high.

In some embodiments, the hub 100 may include a projection lamp 4 to display video files that may be accessed from internal storage or from other electronic devices connected to the hub 100. The projection lamp 4 may be used for example to project static pictures, slides, or moving pictures such as movies onto nearby walls. As will be appreciated, many charger hubs focus on exchanging power or data between devices and are not expected by the consumer to include audio or video media output. The addition of a projection lamp may be more unexpected in a charger hub if one considers that projection lamps focus on quality image processing from multiple data sources (one at a time). However, there is with no suggestion on data transfer between the multiple sources. The arrangement in embodiments disclosed may provide data transfer between the multiple sources and provide image projection in a convenient portable device.

In some embodiments, many of the functions in the hub 100 may be accessed and controlled by an electronic display 5. In an exemplary embodiment, the display 5 may be an LCD screen. The display 5 may be configured for touch-screen capability which in some embodiments, may provide digital buttons 41 shown in the screen, which when pressed, activate a function.

Figure 11:
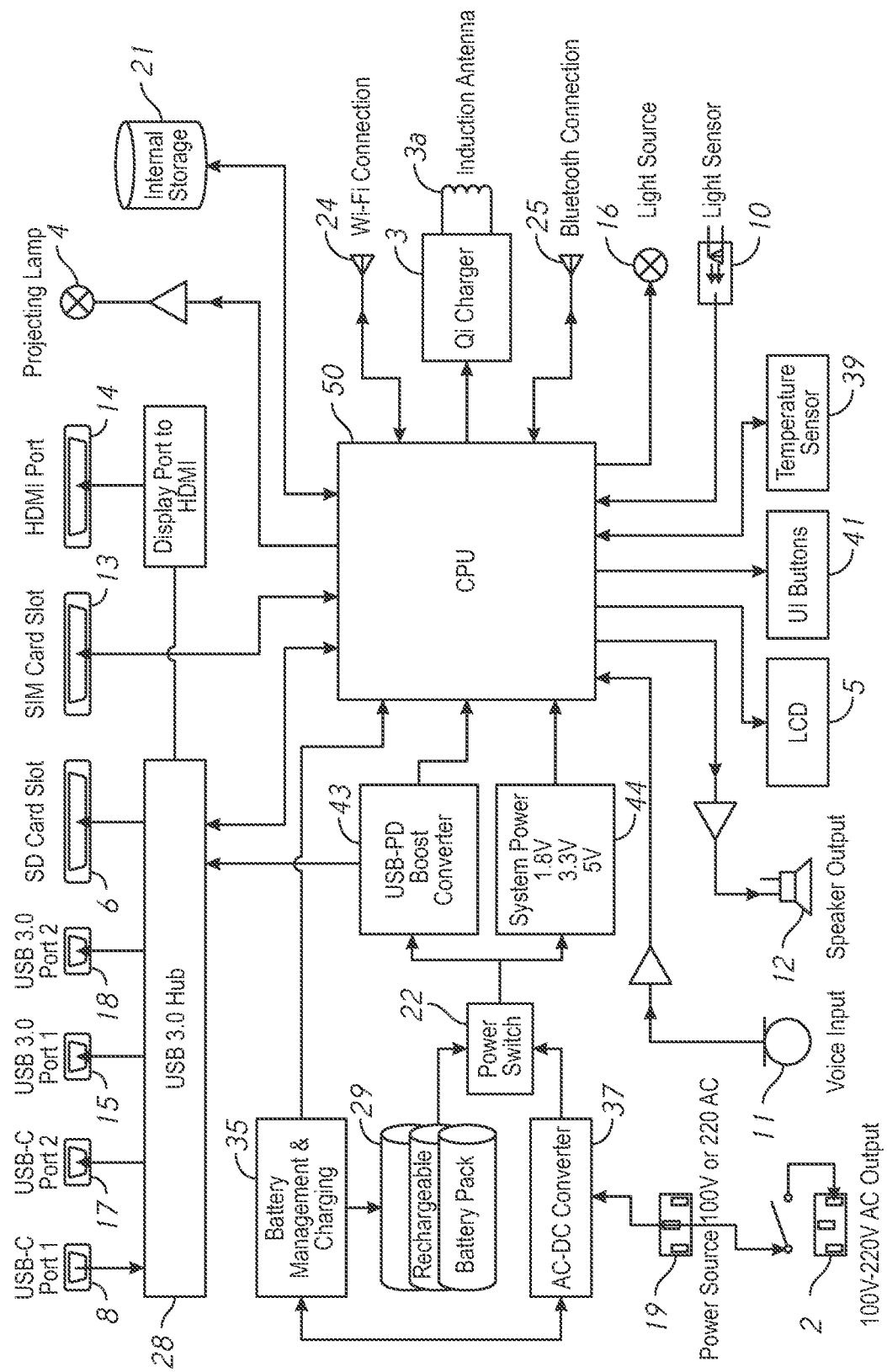
FIG. 11 is a schematic view of component connections in a multi-function device according to an exemplary embodiment.

The hub 100 may also include multiple ports of different types. The ports may be configured for communication or provide an auxiliary data storage location. For example, an SD card reader 6 may be integrated into the housing 1, which may be used with a separate SD card to store data or be accessed by another device connected to the hub 100. A plurality of USB ports (8, 15, 17, and 18) may be included. The USB ports may be of different connector types and/or specification types. For example, USB ports 8 and 17 may be USB-C type connections. USB ports 15 and 18 may be configured for USB 3.0. The USB hub 28 may have two main functions. The first may be to transfer data between different interfaces (for example, between a flash drive, external hard disk, phone, tablet, printer/scanner, or digital camera, to for example, mirror a video data from one device onto a computer screen) by connecting the USB-C to a computer and the HDMI to a display (monitor or projector). The second function may be to provide power any device using USB or USB-C interface. Internally, the hub 100 may include high-speed data storage 21 (FIG. 11). The high-speed data storage may store software applications providing functional services, including for example, video streaming coordinated by the CPU 50. As will be appreciated, unlike conventional charger stations, the hub 100 may use the integrated SD card reader 6, USB ports (8, 15, 17, and 18), the data storage 21, or wireless connectivity (described more fully below) to read files (for example, videos) which may be played through the projection lamp 4 and whose audio files (or any audio file for that matter) may be heard through a speaker 12 integrated into the housing 1.

In some embodiments, the hub 100 may include a HDMI port 14 which may be used to provide HDMI configured data to or from the hub 100 and another device. In some cases, this may also be used for streaming files. The HDMI port 14 may be primarily an output source, so it provides display capabilities to an external monitor, TV or projector (not shown). In an exemplary embodiment, the data into the HDMI port 14 may be received from for example, through either of the USB-C ports 8;17 that reads from a computer, a USB data source (for example, a flash drive or from data stored on the internal storage).

Figure 8:
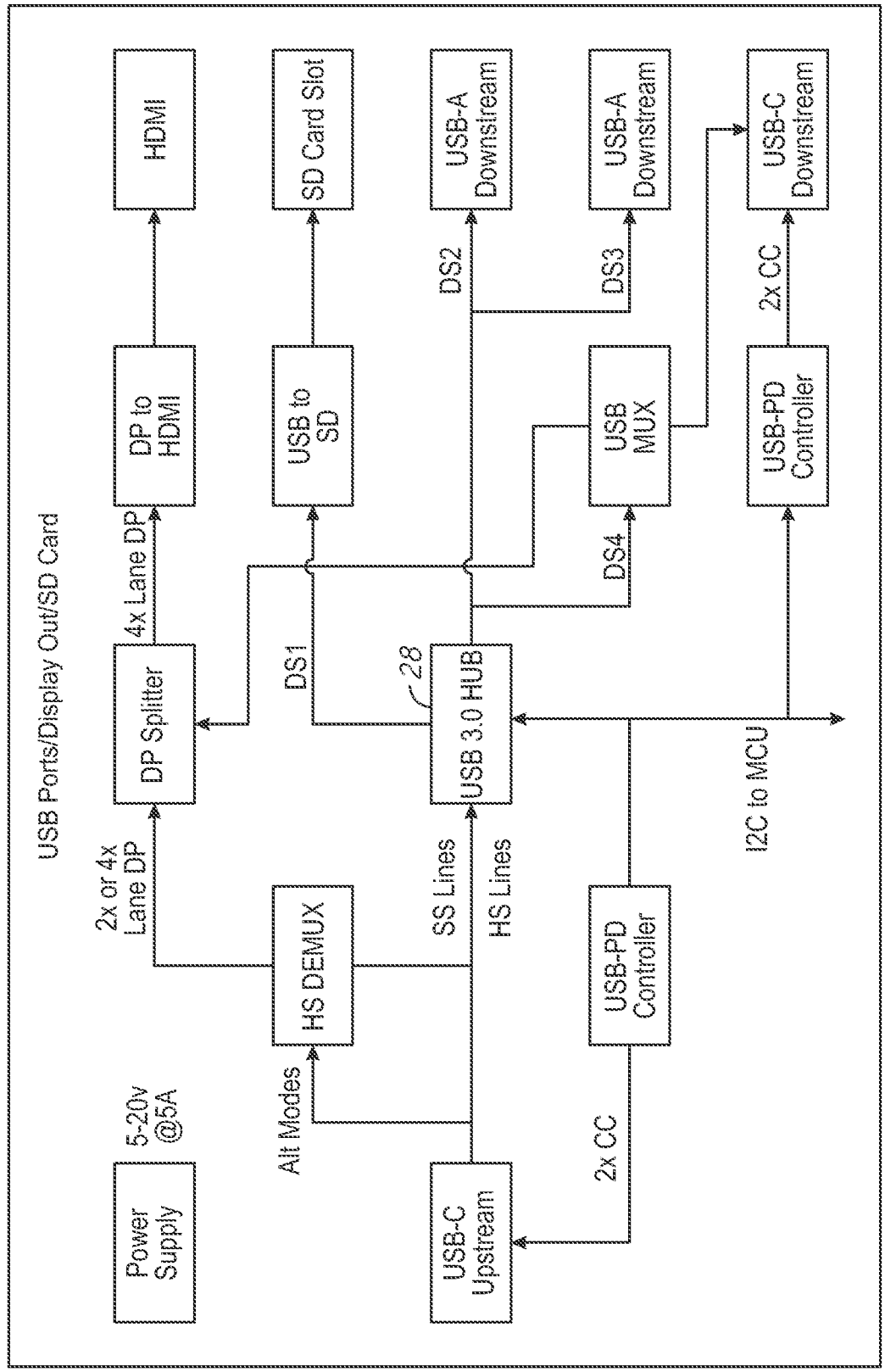
FIG. 8 is a block diagram schematic of electronic connections between multiple device functions according to an embodiment of the invention.

Referring temporarily to FIG. 8, the schematic shows how the data flows within the USB Hub 28 (FIG. 11). The USB-C Upstream box may be the main interface (controlled by the CPU 50). Data may then flow to the USB3.0 hub 28 which sends and receives from downstream ports and the SD Card reader 6. The USB-C Upstream may also send image data to the DP Splitter (digital photography splitter) (controlled by the CPU 50), which in turn sends the output to the HDMI port 14.

Some embodiments of the hub 100 may include wireless connectivity for communication. For example, the hub 100 may include a Bluetooth® enabled module 25 for short range connection. In some embodiments, the CPU 50 may be configured to establish long range wireless connections, using for example, a Wi-Fi module 24. A user may insert their own SIM card into SIM card slot 13 to establish an identification for telephony/Internet services. As may be appreciated, different users may leverage this feature by bringing their own SIM card. Thus, while charging a device, the device may also be used for Wi-Fi applications.

The hub 100 may also include a light source 16 which may include one or more LEDs. In an exemplary embodiment, the hub 100 may include a light sensor 10 which may detect the ambient light level. If the ambient light level drops to a threshold, the CPU 50 may activate one or more of the LEDs to provide lighting around the hub 100.

In another embodiment, the hub 100 may include a microphone 11 which may be connected to the CPU 50. The CPU 50 may be programmed to detect sounds commands through the microphone 11 which may trigger an action such as automatic powering up of the hub 100 or activating/deactivating power to outlet 2.

In some embodiments, the hub 100 may include one or more male plugs 19. The plug 19 may include foldable prongs which may be stowed within recesses 20 in the housing 1. The plug(s) 19 may be connected to the hub 100 power systems which will be described now in detail.

Figure 9:
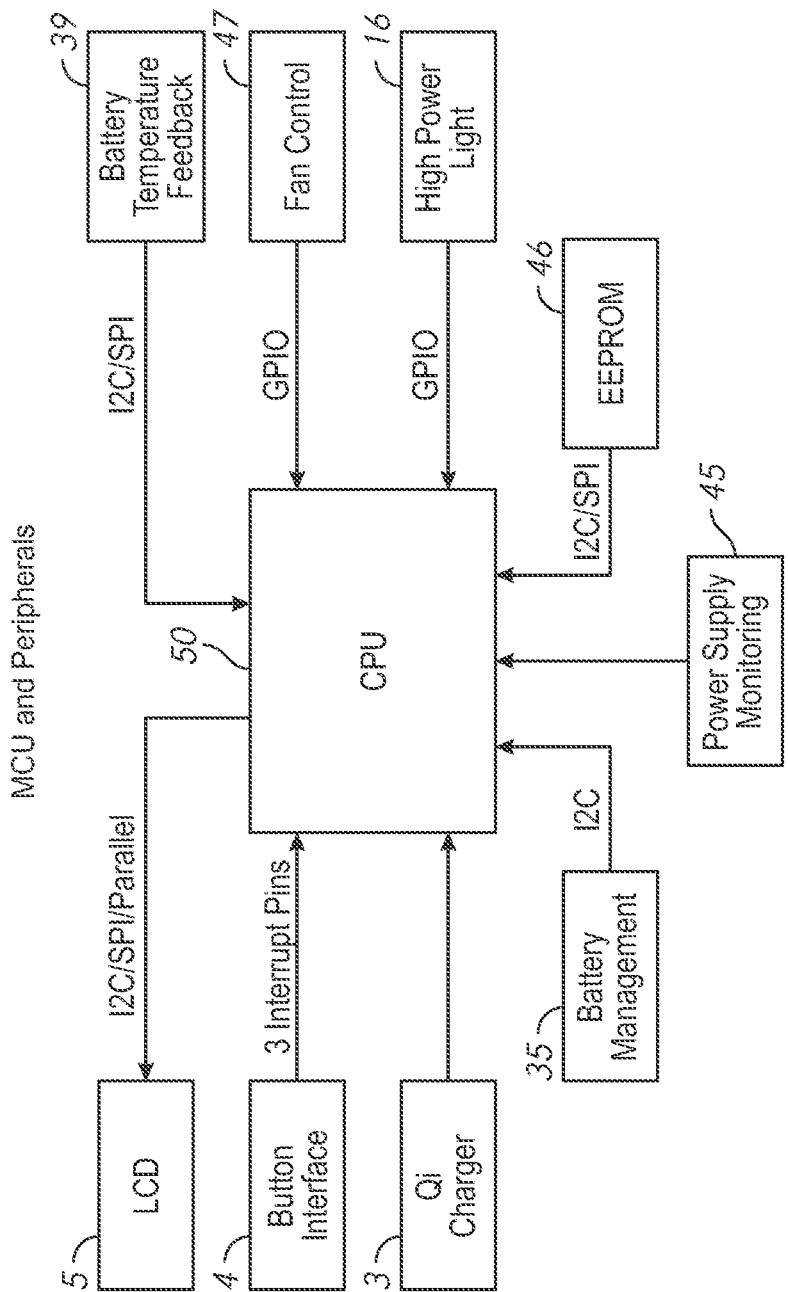
FIG. 9 is a block diagram of connections between a controller and peripheral components in a multi-function device according to an exemplary embodiment.
Figure 10:
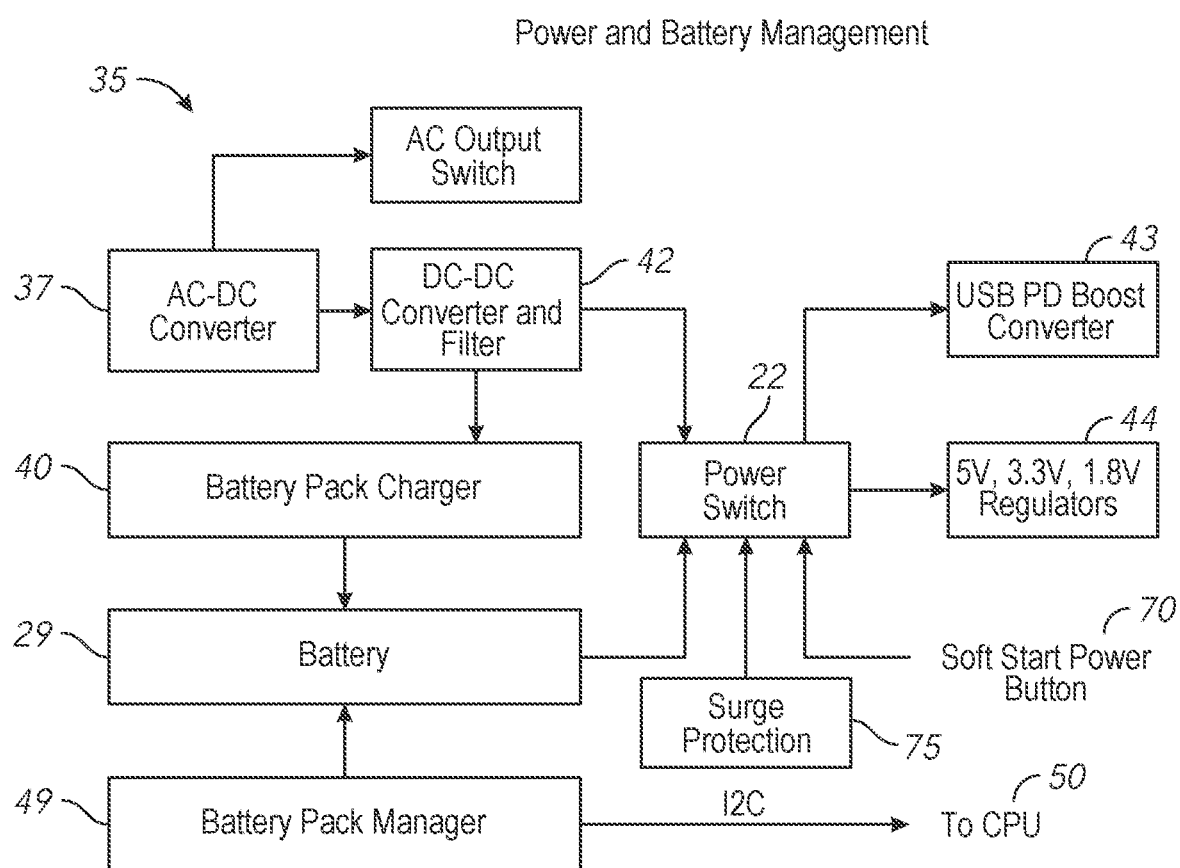
FIG. 10 is a block diagram showing power and battery management amongst connections in a multi-function device according to an exemplary embodiment.

Referring now to FIGS. 9-11, in an exemplary embodiment, the hub 100 includes a battery pack 29 which may be used to power connected electronic devices. The battery pack 29 may be bi-directional providing power out, while simultaneously being able to recharge power from electricity provided through the plug(s) 19. In an exemplary embodiment, the battery pack 29 is swappable and may be replaced on demand with another battery pack 29 at the user's discretion. Some embodiments may include a battery management and charging module 35 (details of which are shown in FIG. 10). Power coming in from the plug 19 may be converted using an AC-DC converter 37, which is regulated by the battery management system 35 and connected to the power switch 22. In some embodiments, the power switch 22 may be connected to a soft start power button 70. Some embodiments may include a surge protection module 75 preventing the electrically connected elements including the CPU 50 from excessive power. In an exemplary embodiment, the battery management and charging module 35 has three main parts. There may be an input part which comes from the AC source to the DC converter 37 which steps down the power and converts it to DC current. A second part includes a battery charger 40 that takes the DC current (which in some embodiments may be run through a DC-DC converter and filter 42) and manages the battery pack 29 charging. A third part includes a battery pack manager 49 which is controlled by the CPU 50 to draw from the battery pack 29, the correct voltage and current for use in other components (for example, the USB ports (8, 15, 17, and 18), the wireless charger 3, and the HDMI connection 14. Some embodiments may include a power supply monitoring module 45 which may monitor the power supply input levels (for example, at 110V or 220V). In some embodiments, a system power regulator module 44 controls the amount of power provided to other components (via the CPU 50). As may be appreciated, given the wide variety of components that are not typically found together in the same package, the power regulator module 44 provides an unexpected benefit by making the power needs of the various components compatible within the shared housing. The Power Distribution Boost Converter (USB-PD) 43 controls the power distribution between the USB ports.

In some embodiments, a battery temperature feedback module 39 may be included which monitors the temperature of the battery pack 29. The module 39 may be a circuit board housing a temperature sensor (sometimes also referred to simply as the temperature sensor 39), whose feedback is processed for the CPU 50. The CPU 50 may be configured to detect when the battery pack 29 exceeds a threshold temperature and may activate a fan (not shown) via fan control 47 (FIG. 9). The fan control 47 automatically controls the fan's on/off status and fan speed based on the feedback from the temperature sensor 39. Some embodiments may include an EEPROM 46 which may store internal data as read only memory (ROM).

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A multi-function, portable electronic hub, comprising:
    a housing;
    a central processing unit (CPU) in the housing;
    a bi-directional power bank housed in the housing and connected to the CPU, the bi-directional power bank configured to supply power on demand and configured to re-charge;
    a power switch connected to the power bank and the CPU;
    a plurality of universal serial bus (USB) ports connected to the CPU and integrated into one or more surfaces of the housing;
    a subscriber identification module (SIM) card slot and a wireless antenna, wherein the CPU is configured to establish a wireless signal to the Internet through the wireless antenna using SIM cards swapped in and out of the SIM card slot by users;
    a universal electrical outlet integrated into the housing and connected to the power bank, the universal electrical outlet configured to receive a variety of plugs from one or more external electrical devices;
    a microphone connected to the CPU, wherein the CPU is programmed to register an audible command signal through the microphone and in response to the command, activate the power switch; and
    an image projecting lamp integrated into the housing and connected to the CPU, wherein the CPU is configured to transmit a video data stream from one of the plurality of USB ports, wherein the image projecting lamp is configured to project the video stream onto a wall proximate the hub.

2. The electronic hub of claim 1, further comprising internal data storage storing a software application for playback of streaming video, wherein the CPU is configured to operate the playback of the streaming video through the projection lamp.

3. The electronic hub of claim 1, wherein the power bank is swappable.

4. The electronic hub of claim 1, further comprising a wireless charging module integrated into the housing for wireless charging of mobile electronic devices.

5. The electronic hub of claim 1, further comprising water-proofing integrated into the housing.

6. The electronic hub of claim 1, further comprising a surge protection module connected to at least one electrical component in the housing.

7. The electronic hub of claim 1, wherein the plurality of USB ports include USB ports of different connector types.

8. The electronic hub of claim 7, wherein the plurality of USB ports include USB ports of different USB specification types.

9. The electronic hub of claim 1, further comprising:
    a male electrical plug, including prongs, integrated into the housing and connected to the power bank, the male electrical plug configured to fit into a wall outlet.

10. The electronic hub of claim 9, further comprising recesses integrated into the housing and configured to fit the prongs of the male electrical plug, wherein the male electrical plug is configured to fold into the recesses.

* * * * *